United States Patent Office 3,318,852
Patented May 9, 1967

3,318,852
FLUORINE-CONTAINING POLYMERS
George M. Dixon, St. Paul, Minn., assignor to Minnesota
Mining and Manufacturing Company, St. Paul, Minn.,
a corporation of Delaware
No Drawing. Filed Apr. 5, 1965, Ser. No. 445,689
5 Claims. (Cl. 260—78.5)

This application is a continuation-in-part of my prior application S.N. 109,259, now abandoned, filed May 11, 1961.

This invention relates to new and useful copolymers having a high "tack temperature," which are soluble in conventional organic solvents and contain perfluorocarbon "tails."

The useful properties attributed to fluorocarbon-containing compounds and polymers in regard to their oleophobicity and hydrophobicity has been known for many years. Their use in the treatment of textiles, paper, and other similar materials has also been practiced for many years with varying degrees of effectiveness.

It is an object of this invention to provide fluorine-containing copolymers, which have a combination of physical properties that makes them ideally suited to serve as a release agent between dissimilar surfaces at elevated temperatures. Likewise, their solubility in conventional organic solvents makes it possible to apply the copolymers of this invention to surfaces to be treated in conventional manner. Indicative of their usefulness and the importance of the combination of properties possessed by the copolymers, is the fact that they constitute the first commercial embodiment of a fluorine-containing copolymer low adhesion backsize for pressure-sensitive adhesive tapes. Their application in this field makes possible a reduction in the caliper of cellophane employed in the manufacture of cellophane backed pressure-sensitive adhesive tape for the retail trade at no loss of dispensability, thereby effecting a significant reduction of raw material cost. It was also discovered that the stability of tapes to discoloration when prepared with the copolymers of this invention were markedly superior to comparable untreated tapes and tapes treated with other known low adhesion backsizes. Further evidence of their usefulness, is their unique combination of physical properties exhibited when applied to the back side of an abrasive disc for use in disc-sanding machines at high temperatures in auto-body shops. These discs are bonded to a rubber pad in the disc sander by means of an adhesive, and their removal is greatly facilitated by treating the smooth back side of the sandpaper with the copolymers of this invention. Various other advantages to the copolymers of this invention will become apparent hereinafter.

Accordingly, it has been discovered that the above objects and advantages are accomplished by the preparation of copolymers which have an inherent viscosity in iso-propanol in the range of 0.1 to 2.0, a high tack temperature of at least 60° C., preferably 100 to 250° C. and solubility of at least 10 parts by weight in 90 grams of a 50–50 mixture by weight of iso-propanol and methyl ethyl ketone, which are insoluble in xylene hexafluoride, which contain 10 to 80 percent (preferably 40–80) by weight of their polymerized units derived from an ethylenically unsaturated monomer containing a functional group forming a conjugated system with the ethylenic linkage wherein between about 10 and about 90 mole percent, preferably between about 15 and about 85 mole percent, (10–50 by weight) of the polymerized units of the copolymer contain a free carboxylic acid group as the functional group forming the conjugated system and all other functional groups forming the conjugated system are hydrolyzable to a free carboxyl acid group, and 20–90 percent (preferably 20–60) by weight of monomeric units derived from an ethylenically unsaturated monomer containing a fluoroalkyl group of at least 6 carbon atoms.

The release property of the copolymer is provided by the ethylenically unsaturated monomer containing the fluoroalkyl group. The adhesive property of the copolymer assuring its fixation to the substrate is provided by the ethylenically unsaturated monomer containing the free carboxyl group. The solubility of the copolymer is enhanced by the use of a third comonomer which also is an ethylenically unsaturated monomer containing a functional group which forms a conjugated system with its unsaturated bond and is hydrolyzable to a carboxyl group. Each of the monomers contributes to the overall properties of the copolymer depending to some extent upon the properties of each. The copolymer must be derived from both the fluorinated monomer and the carboxyl group-containing monomer but a third monomer may be utilized to modify the ultimate properties of the copolymer.

Because of their solubility in organic solvents, the copolymers of this invention may be applied to surfaces with conventional equipments such as by brushing, spraying, immersion, roll or knife coating. Especially advantageous is their application to flexible organic sheet materials. The effectiveness of the copolymers of this invention at low concentrations is evidenced by the fact that it is preferable to coat between 10 and 1,000 square centimeters of surface with a milligram of copolymer. Their application at this low level is best effected from a 1 to 10 weight percent solution of the copolymer in an oxygenated hydrocarbon solvent, such as ethanol, iso-propanol, acetone, methyl ethyl ketone, or tert-butanol. Hydrocarbon solvents, such as toluene may be used in combination with the oxygenated hydrocarbon solvent. If desirable, the copolymer solution may be dispersed in water. However, for the treatment of certain hydrophilic surfaces, such as cellophane, the presence of water is not desired, and the ability to use an all organic solvent solution as an advantageous feature of this invention is further accentuated.

The preparation of these copolymers is exemplified by polymerizing the desired monomers dissolved in an organic solvent in the presence of a free-radical initiator, such as benzoyl peroxide. Organic solvents that have been used are acetone, ethyl acetate, ethanol, tert-butanol, isopropanol, and mixtures thereof. The polymerization is preferably carried out in an inert atmosphere at a temperature of 40 to 75° C. While it is only essential that the chemical composition of the copolymer be composed of monomeric units as outlined above, economics dictate that a high ratio of the monomers charged to the reaction zone be converted to units of the copolymer. In each of the preferred embodiments of this invention, set forth in examples, conversions of at least 80 percent of monomers charged and as high as 90 percent or higher were effected by carrying out the polymerization for a period of 16 hours. Depending upon the selection of optimum conditions for reaction, the reaction time may be a period of 4 hours or less. Measurement of the refractive index is one known technique for determining the degree and rate of polymerization for optimization of reaction. As a result of the high conversions and the similar rates of reaction of the monomers, the copolymer contains substantially the same ratio of monomer units as in the feed mixture.

The requisite physical and chemical analysis of the polymer may be measured as follows: (All data in this specification were measured by the following techniques, but other methods are available that will produce substantially the same values.)

Inherent viscosity—measured in an Ostwald Viscometer at 25° C. using an iso-propanol solution of one gram of polymer per 100 milliliters of solution.

Tack temperature—a small piece of the polymer is heated on a melting point block and the temperature is slowly raised. The temperature at the surface of the block at which the polymer resists removal from block with a spatula is the "tack-temperature." The value is reproducible to within about plus or minus 5° C.

Carboxyl group content—measured by determining the acid number of the polymer by titration with a standard methanol solution of sodium methoxide. The acid number for any given polymer will vary depending upon the monomers employed. However, once the system is defined, the correlation of "acid number" to monomer make-up of the copolymer is a simple calculation.

Fluorine content—measured by conventional elemental chemical analysis. Here again, once the monomer system is defined, a determination of the proportion of fluorine-containing monomer units is a simple calculation from the fluorine content of the copolymer.

In the preparation of the copolymers of this invention, the fluorine-containing monomer utilized is one in which a fluoroalkyl group is bonded by at least one functional group to an ethylenically unsaturated linkage, and may be preferably defined by the following formula:

$$R_fQCR=CH_2$$

where $R_f$ is a fluoroalkyl group containing 6 to 12 carbon atoms (preferably a perfluoroalkyl group such as $CF_3(CF_2)_{6-12}$), Q is a functional organic bridging radical and R is hydrogen or an alkyl group containing 1 to 6 carbon atoms. Illustrative of these monomers are methyl, ethyl, propyl, or butyl perfluorooctyl sulfamido ethyl methacrylate, methyl, ethyl, propyl, or butyl perfluorooctyl sulfamido ethyl acrylate, and N-methyl perfluorooctyl sulfamido methyl vinyl acetate, Various monomers of this type are disclosed in U.S. Patent No. 2,803,615.

The ethylenically unsaturated monomer containing a free carboxylic acid group is preferably an $\alpha,\beta$-unsaturated monocarboxylic acid, such as acrylic acid, methacrylic acid, crotonic acid, itaconic acid and cinnamic acid. The third monomer which may be used is an ethylenically unsaturated monomer containing a functional group which forms a conjugated system with its ethylenically unsaturated bond and is hydrolyzable to a free carboxylic group. As such, the conjugation is to be distinguished from that of a diene compound i.e., butadiene. Illustrative of such functional groups are esters, anhydrides, nitrile, and amides. Specific and preferred monomers of this group are acrylonitrile, methyl methacrylate, butyl acrylate, ethyl acrylate, cyclohexyl acrylate, octadecyl acrylate, acrylamide and methacrylamide.

This invention may be illustrated further by reference to the following preferred embodiments in which all "parts" are expressed as parts by weight and all "percentages" are expressed as percent by weight, unless specified otherwise.

Example I

A monomer mixture (35 parts) containing 55 parts of N-ethyl-perfluorooctyl sulfonamido ethyl methacrylate, 40 parts acrylic acid and 5 parts n-octadecyl acrylate, benzoyl peroxide (0.35 part) and a solvent mixture (65 parts) containing 88 parts ethyl acetate and 12 parts ethyl alcohol were placed in a reaction vessel. The reaction vessel after being flushed with nitrogen was sealed and placed in water bath maintained at 60° C. and tumbled for 16 hours at which time the polymerization was complete as evidenced by a conversion of over 90 percent of the monomer charged. The copolymer contained units of the respective monomers in the mole percent 13.1, 84.6 and 2.3 in the above order.

The copolymer was soluble in a 50–50 mixture of isopropanol and methyl ethyl ketone, had a "tack temperature" above 170° C., and an inherent viscosity of 0.37.

A 1.5 percent solution of the polymer was coated on the unprimed side of a transparent cellophane film which was subsequently coated on the primed side with a pressure-sensitive adhesive.

The unwind characteristics of this tape were excellent and greatly surpassed the minimum standards established for low adhesion backsizes. It was also noted that tapes using the copolymer of this invention as a low adhesion backsize withstood discoloration markedly better than various other tapes of identical construction, except for the backsize employed.

Tape samples using the copolymer of this example as a low adhesion backsize were prepared as outlined above, by applying a 0.0125 mg. coating of copolymer per square centimeter. Various pressure-sensitive adhesive were applied to the front side of the tape, and their physical characteristics as observed were as follows:

TABLE I.—UNWIND [1]

| Tape | Initial | After 7 months at 22° C. | After 11 days at 120° F. | After 16 hours at 150° F. |
|---|---|---|---|---|
| Backsized A | 8 | 20 | 13 | 16 |
| Backsized B | | | 13 | |
| Backsized C | | | 2 | |
| Backsized D | | | 7 | |
| Control A [2] | 28 | 32 | 32 | 34 |

[1] Ounces of force required to remove ½ square inch of tape from a tape surface.
[2] No low adhesion backsize was applied to the control tape.

TABLE II.—STEEL ADHESION [1]

| Tape | Initial | After 7 months at 22° C. | After 11 days at 120° F. | After 16 hours at 150° F. |
|---|---|---|---|---|
| Backsized A | 35 | 38 | 37 | 36 |
| Backsized B | | | 34 | |
| Backsized C | | | 32 | |
| Backsized D | | | 40 | |
| Control A [2] | 30 | 30 | 30 | 30 |

[1] Ounces of force required to remove ½ square inch of tape from a steel surface.
[2] See footnote 2, Table I.

TABLE III [1].—RELATIVE ADHESION [2]

| Tape | After 24 hours at 77° F. | After 16 hours at 120° F. | After 16 hours at 150° F. |
|---|---|---|---|
| Backsized A | 0.39 | 0.47 | 0.54 |

TACK RETENTION [3]

| Tape | After 24 hours at 77° F. | After 16 hours at 120° F. | After 16 hours at 150° F. |
|---|---|---|---|
| Backsized A | 1.21 | 1.22 | 1.25 |

[1] In measurement of relative adhesion and tack retention, the tape is adhered to surface from which it is to be stripped for two minutes and then stripped at a constant rate of about 100 centimeters per minute at an angle of 90° to the surface from which it is stripped.
[2] Ratio of force required to strip the tape from a backsized surface to the force required to strip the same tape from a surface having no backsize.
[3] Ratio of the adhesion of a tape sample stripped from a backsized cellophane surface to its adhesion to a nonbacksize cellophane.

Tapes A–D were prepared utilizing as the pressure-sensitive adhesive a 100:75 parts by weight mixture of natural rubber and "Piccolyte S115," a product of Pennsylvania Industrial Chemical; isooctyl acrylate (94.5 parts), and acrylic acid (4.5 parts) copolymer; resin tackified-polyvinyl ethyl ether; and SBR synthetic rubber containing "Polypale," a product of Hercules Powder Company, as a tackifier, respectively. Accordingly, it is self-evident that the copolymers of this invention when used as backsizes may be used effectively with a variety of pressure-sensitive adhesives.

The copolymers of this example contained approximately 25 percent fluorine, as determined by elemented analysis, and had an acid member of 38.

*Example II*

A monomer mixture of N-ethyl-perfluorooctyl sulfamido ethyl methacrylate (75 parts), acrylic acid (20 parts) and octadecyl acrylate (5 parts) was polymerized in the manner set forth in Example I. This copolymer had a "tack-temperature" greater than 160° C., an inherent viscosity of 0.142, and exhibited good low adhesion backsize characteristics for pressure-sensitive adhesive tapes. The mole percent of the monomer units in the copolymer was 28.5, 67.8 and 3.7 in the above order.

*Example III*

A monomer mixture of N-ethyl-perfluorooctyl sulfamido ethyl methacrylate (30 parts), acrylic acid (40 parts) and octadecyl acrylate (30 parts) was polymerized in the manner set forth in Example I. This copolymer had a "tack-temperature" of 150° C., an inherent viscosity of 0.35, and exhibited good low adhesion backsize characteristics for pressure-sensitive adhesive tapes. The mole percent of the monomer units in the copolymer was 6.8, 79.8 and 13.4 in the above order.

*Example IV*

A monomer mixture of N-ethyl-perfluorooctyl sulfamido ethyl methacrylate (40 parts), acrylic acid (10 parts), cyclohexyl acrylate (25 parts) and acrylonitrile (25 parts) was polymerized in the manner set forth in Example I. The solubility characteristics of the polymer were excellent, i.e., over 10 parts in 90 parts of a 50:50 mixture of iso-propanol and methyl ethyl ketone. The copolymer functioned as a good low adhesion backsize for pressure-sensitive adhesive tapes. The mole percent of the monomer units in the copolymer was 7.2, 16.9, 19.3 and 56.6 in the above order.

*Example V*

A monomer mixture of N-ethyl-perfluorooctyl sulfamido ethyl methacrylate (51 parts), acrylic acid (9 parts), and acrylonitrile (29 parts) and ethyl acrylate (11 parts) was polymerized in the manner set forth in Example I. The resulting copolymer had a "tack-temperature" of 130° C. and demonstrated excellent low adhesion characteristics. The mole percent of the respective monomer units in the copolymer was 9.2, 14.5, 63.6 and 12.7 in the above order.

*Example VI*

A monomer mixture of N-propyl perfluorooctyl sulfamido ethyl acrylate (50 parts), acrylic acid (30 parts) and octadecyl acrylate (20 parts) was polymerized in the manner set forth in Example I. This copolymer had a "tack-temperature" of about 150° C. The copolymer was soluble at 10 parts of copolymer in 90 parts of a 50-50 mixture of iso-propanol and methyl ethyl ketone. It also exhibited good low adhesion backsize characteristics, but was inferior to the copolymer of Example I in this regard. The mole percent of the respective monomer units in the copolymer was 12.0, 76.9 and 11.1 in the above order.

*Example VII*

A monomer mixture of N-methyl perfluorooctyl sulfamido ethyl acrylate (40 parts), acrylic acid (40 parts) and octadecyl acrylate (20 parts) was polymerized in the manner set forth in Example I. This copolymer was a good low adhesion backsize for pressure-sensitive adhesive tapes.

*Example VIII*

A copolymer was prepared from 80 parts N-ethyl-perfluorooctyl sulfamido ethyl methacrylate and 20 parts acrylic acid in the same manner as Example I, except that the solvent employed contained some acetone. This copolymer functioned as a good low adhesion backsize for pressure-sensitive adhesive tape. The mole percent of the monomer units in the copolymer was 31% fluorinated monomer and 69% acrylic acid.

*Example IX*

A copolymer was prepared from 20 parts N-ethyl-perfluorooctyl sulfamido ethyl methacrylate, 40 parts acrylic acid and 40 parts octadecyl acrylate in the same manner as Example I, except that the solvent employed contained some acetone. This copolymer had a "tack-temperature" greater than 160° C. and made a good low adhesion backsize for pressure-sensitive adhesive tape. The mole percent monomer units in the copolymer was 4.3, 78.7 and 17.0 in the above order.

*Example X*

Two copolymers were prepared and designated copolymers A and B respectively. Copolymer A was prepared from 90 parts of N-ethyl-perfluorooctyl sulfamido ethyl methacrylate and 10 parts of acrylic acid in the same manner as Example I. Copolymer A contained approximately 50 mole percent of the fluorocarbon monomer and 50 percent of acrylic acid monomer. Copolymer B was prepared from 60 parts of N-ethyl perfluorooctyl sulfamido ethyl methacrylate, 35 parts of methyl methacrylate and 5 parts acrylic acid in the same manner as Example I. Copolymer B contained approximately 18.3 mole percent of the fluorinated monomer, 68.1 percent of the methacrylate monomer and 13.6 percent acrylic acid. The physical characteristics of the copolymers are shown in Table IV below:

TABLE IV

| | Relative [1] Adhesion (RA) | Absolute Adhesion on Unwind, oz./½ in. | Tack Retention (in RA values) | Absolute Adhesion, oz./½ in. |
|---|---|---|---|---|
| Copolymer A | 0.65= | 16.2 | 1.04= | 26.0 |
| Copolymer B | 0.53= | 13.2 | 1.10= | 27.5 |

[1] Adhesion to glass=25 oz./½ in. width=1.0 as relative adhesion (RA). Adhesive used in testing=crude rubber/Piccolyte.

The copolymers of this invention also materially advance the "contact angle" for the surface coated with them. The "contact angle" for purposes of this invention is the angle at which a droplet of hexadecane will roll down a surface coated with the copolymer. In every known instance, the contact angle effected by the polymers of this invention exceeds 50° and in most cases approximates 70°, whereas the best known non-fluorine-containing backsizes are materially less than 50°.

Contact angles measured using the copolymers of the preferred embodiments were as follows:

TABLE V

| Example | Contact angle (degrees) |
|---|---|
| I | 68 |
| II | 72 |
| IX | 59 |

The standards of a good low adhesion backsize for the purposes of this specification were (1) that the relative adhesion be at least 0.85 and (2) that tack retention is at least 0.9.

Another method for demonstrating the effectiveness of a low adhesion backsize are to connect two rolls of tape and then pull in opposite directions with equal force on both rolls. The comparative ease with which the two unwind gives a good qualitative evaluaiton of the low adhesion backsizes applied to one or both of tape rolls.

I claim:

1. A copolymer which has an inherent viscosity in iso-propanol in the range of 0.1 to 2.0, a "high-tack temperature" at least 60° C., solubility of at least 10 parts by weight in 90 parts by weight of a 50-50 mixture of iso-propanol and methyl ethyl ketone and is insoluble in xylene hexafluoride which contains (1) 10 to 80 percent by weight of its polymerized units derived from an ethylenically unsaturated monomer containing a functional group forming a conjugated system with the ethylenic linkage wherein at least 10 mole percent of these polymerized units of the copolymer contain a free carboxylic acid group as the functional group forming the conjugated system and any other of these polymerized units of the copolymer contain a functional group which is hydrolyzable to a free carboxylic acid group as the functional group forming the conjugated system, and (2) 20 to 90 percent by weight of monomeric units derived from an ethylenically unsaturated monomer containing a perfluoroalkyl group of at least six carbon atoms.

2. A terpolymer which has an inherent viscosity in iso-propanol in the range of 0.1 to 2.0, a "high-tack temperature" at least 60° C., solubility of at least 10 parts by weight in 90 parts by weight of a 50-50 mixture of iso-propanol and methyl ethyl ketone and is insoluble in xylene hexafluoride which contains (1) 10 to 80 percent by weight of its polymerized units derived from ethylenically unsaturated monomers containing a functional group forming a conjugated system with the ethylenic linkage wherein (a) between about 10 and about 90 mole percent of these polymerized units of the terpolymer contain a free carboxylic acid group as the functional group forming the conjugated system and wherein (b) the remainder of these polymerized units of the terpolymer contain a functional group which is hydrolyzable to a free carboxylic acid group as the functional group forming the conjugated system, and (2) 20 to 90 percent by weight of its polymerized units derived from an ethylenically unsaturated monomer contain a perfluoroalkyl group of at least six carbon atoms.

3. The terpolymer of claim 2 in which the polymerized units containing a functional group hydrolyzable to a free carboxylic acid is derived from an acrylate ester of a straight chain hydrocarbon alcohol containing from 12 to 20 carbon atoms.

4. A flexible organic sheet material surface coated on one side with 1 milligram per 10 to 1000 square centimeters of treated surface of a copolymer which has an inherent viscosity in iso-propanol in the range 0.1 to 2.0, a "high-tack temperature" of at least 60° C., solubility of at least 10 parts by weight in 90 parts of weight of a 50-50 mixture of iso-propanol and methyl ethyl ketone and is insoluble in xylene hexafluoride which contains (1) 10 to 80 percent by weight of its polymerized units derived from an ethylenically unsaturated monomer containing a functional group forming a conjugated system with the ethylenic linkage wherein at least 10 mole percent of these polymerized units of the copolymer contain a free carboxylic acid group as the functional group forming the conjugated system and any other of these polymerized units of the copolymer contain a functional group which is hydrolyzable to a free carboxylic acid group as the functional group forming the conjugated system, and (2) 20 to 90 percent by weight of monomeric units derived from an ethylenically unsaturated monomer containing a perfluoroalkyl group of at least six carbon atoms.

5. A pressure sensitive adhesive tape containing thereon as a low adhesion backsize, a copolymer which has an inherent viscosity in iso-propanol in the range of 0.1 to 2.0, a "high-tack temperature" at least 60° C., solubility of at least 10 parts by weight in 90 parts by weight of a 50-50 mixture of iso-propanol and methyl ethyl ketone and is insoluble in xylene hexafluoride which contains (1) 10 to 80 percent by weight of its polymerized units derived from an ethylenically unsaturated monomer containing a free carboxylic acid functional group or a functional group hydrolyzable to a free carboxylic acid group forming a conjugated system with the ethylenic linkage wherein at least 10 mole percent of these polymerized units of the copolymer contain the free carboxylic acid functional group and any other of these polymerized units of the copolymer contain the functional group which is hydrolyzable to a free carboxylic acid group, and (2) 20 to 90 percent by weight of monomeric units derived from an ethylenically unsaturated monomer containing a perfluoroalkyl group of at least six carbon atoms.

References Cited by the Examiner

UNITED STATES PATENTS

| | | | |
|---|---|---|---|
| 2,803,615 | 8/1957 | Ahlbrecht et al. | 260—29.6 |
| 3,198,770 | 8/1965 | Watkins | 260—80.5 |

JOSEPH L. SCHOFER, *Primary Examiner.*

D. K. DENENBERG, *Assistant Examiner.*